E. G. WATROUS.
VALVE.
APPLICATION FILED AUG. 17, 1910.

995,642.

Patented June 20, 1911.

Witnesses
Martin A. Olsen
Robert Dobberman

Inventor
Earl G. Watrous
By Rector, Hibben, Davis & Macauley
His Att'ys

UNITED STATES PATENT OFFICE.

EARL G. WATROUS, OF CHICAGO, ILLINOIS.

VALVE.

995,642.

Specification of Letters Patent. Patented June 20, 1911.

Application filed August 17, 1910. Serial No. 577,658.

*To all whom it may concern:*

Be it known that I, EARL G. WATROUS, a citizen of the United States, residing at Chicago, county of Cook, and State of Illinois, have invented a certain new and useful Improvement in Valves, of which the following is a description, reference being had to the accompanying drawings, forming part of this specification.

My invention relates more particularly to valves for controlling and regulating the relative supplies of hot and cold water to lavatories and the like, and has for its object the provision of a simple and efficient valve of this character which may be used with hot and cold water supplies of differing pressures and which will prevent the water of higher pressure from passing across or around the valve to the water supply of lower pressure and mingling with the latter and forcing it backward in its supply pipe. It has heretofore been a common practice, where valves of this general character were to be employed with hot and cold water supplies of differing pressures, to interpose check valves in the two water-supply pipes, adjacent the main valve, for preventing the backward flow of water in either pipe under a preponderating pressure of water from the other supply pipe; but there are objections to the employment of such check valves, and my improved valve is of such construction as to obviate the necessity for them.

Figure 1:
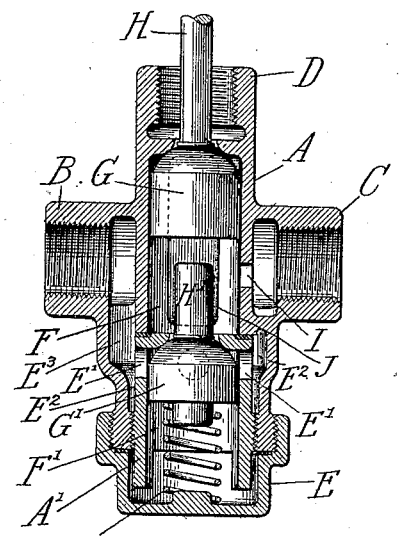
Figure 2:
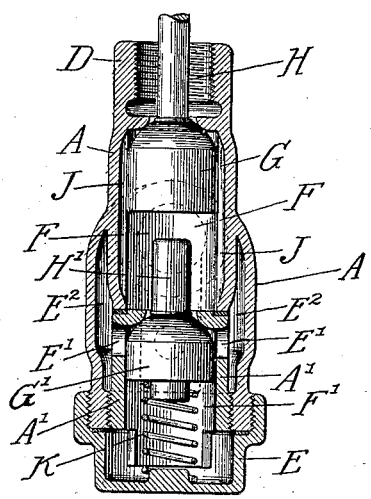

In the acompanying drawings Figure 1 is a middle vertical section of my improved valve in the plane of the pipe-connection for the hot and cold water supply pipes; and Fig. 2 a corresponding view at right angles to that of Fig. 1.

The same letters of reference are used to indicate identical parts in the corresponding views.

The main valve casing A is provided with opposite pipe connections B and C for the hot and cold water pipes, respectively, and with a connection D at its upper end for the delivery pipe leading to the lavatory or other fixture to which the water is to be supplied. The lower end of the casing is closed by a screw-cap E, with suitable interposed packing to form a water tight joint.

Formed within the upper portion of the main casing A, between the opposing pipe connections B and C, is a cylindrical valve chamber F in which fits and travels a valve G carried upon the lower end of a valve stem H which extends up through the delivery-pipe connection D and is connected with suitable operating devices for depressing and lifting it. The valve G comprises a cylindrical body portion, which fits and travels in the chamber F, and an upper end portion composed of a rubber Fuller ball which coöperates with a valve seat formed in the upper end of the chamber around the central opening through which the valve stem H passes. The chamber F is provided in its side wall adjacent the pipe connection C with a port I through which the cold water supply is normally admitted to said chamber beneath the valve G, and in its two opposing side walls between the pipe connections B C the chamber D is provided with longitudinal grooves or recesses J extending from the lower part of the chamber to its upper end and constituting by-passes around the cylindrical body of the valve G. These by-passes are normally filled with cold water from the supply admitted to the lower part of the chamber through the port I, but so long as the valve G remains seated the water cannot escape from the upper end of the chamber and pass to the delivery pipe; but as soon as the valve is unseated, by slightly depressing it, the water will pass from the lower portion of the chamber F through the by-passes J around the body of the valve and out through the central opening around the valve stem in the top of the chamber; and this will continue until the valve stem and valve have been depressed far enough for the latter to ride over and close the port I, and thereby cut off the further admission of the cold water supply to the chamber F. When the valve G has been depressed far enough to begin to close the port I, however, it will begin to open the valve which controls the hot water supply, and which may now be described. This valve G', which is of similar construction to the valve G, is located in a chamber F' formed within a supplemental cylindrical casing A' which is provided with external screw threads and is screwed into the internally threaded lower end of the main casing A. The upper end of this supplemental casing A' abuts against the lower end of the cylindrical wall of the valve chamber F, and a suitable packing is interposed between the two to form a water tight joint. The top wall of the chamber F' is provided with a central opening through which extends the vertically projecting stem H' of the valve G', which is of such length that its upper end normally lies in approximately the plane of the upper edge of the port I. The valve G' fits against a seat formed for it around this central opening in the top of the chamber F' and controls the passage of water through said opening from the chamber F' to the chamber F. A coiled spring K interposed between the bottom of the cap-piece E and the valve G' presses the latter upwardly and yieldingly holds it to its seat.

The cylindrical wall of the chamber F' is provided near its upper end with a plurality of ports E' opening into a chamber E² surrounding the upper portion of the supplemental casing A' containing the chamber F and communicating at one side by an upward extension or passage E³ with the hot water supply pipe connection B, so that hot water is normally admitted to the chamber E² and through the ports E' to the upper part of the chamber F' around the valve G', but so long as the latter remains seated it cannot pass upward into the chamber F. As soon, however, as the valve G has been depressed far enough to begin to close the cold water inlet port I its lower end will come into contact with the upper end of the stem H' of the lower valve G' controlling the hot water supply, and the further downward movement of the valve G will serve to unseat the valve G' and permit the hot water supply to pass upward from the chamber F' to the chamber F and mingle with the cold water supply in the latter. The farther the valves are depressed the more the cold water supply will be cut off and the hot water supply admitted, while a full depression of them will serve to entirely cut off the cold water supply and admit only the hot water supply. By a greater or less depression of the valves, therefore, the relative supplies of cold water and hot water may be controlled and regulated as desired.

As will be understood from the foregoing, when the valves are in their normal closed position the second valve G' entirely separates the cold water supply from the hot water supply, with the result that if they are of differing pressures there is no chance for the water under the higher pressure to escape past the valve to the supply pipe of the water under the lower pressure and mingle with the latter and drive it backward, and therefore no necessity for the employment of check valves in the two supply pipes, as heretofore.

Having thus fully described my invention, I claim:

1. The combination of a valve casing having a valve chamber with a port at each end thereof and a port in the side with an imperforate cylindrical valve in the chamber adapted to close the side port and one of the end ports, a longitudinal by-pass to permit water to pass the valve when away from its end port, a valve controlling the other end port, and pipe connections to said ports.

2. The combination of a valve casing having a valve chamber with a port at each end thereof and a port in the side with an imperforate cylindrical valve in the chamber adapted to close the side port and one of the end ports, a longitudinal by-pass to permit water to pass the valve when away from its end port, a valve controlling the other end port and opening outwardly with respect to the chamber, and pipe connections to said ports.

3. The combination with a valve casing having a valve chamber with a port at each end and a port in the side, an imperforate valve in the chamber adapted to close the side port and an end port, a longitudinal by-pass to permit water to pass the valve when away from its end port, an outwardly-opening valve controlling the other end port and adapted to be operated by the movement of the first-mentioned valve, and pipe connections to said ports.

4. The combination of the valve casing A having the hot and cold water pipe-connections B and C, and the delivery pipe-connection D, and containing the cylindrical chamber F having the by-pass J and provided with the port I communicating with the cold water supply, the supplemental casing A' secured in the lower part of the main casing A and containing the valve chamber F' having the outlet at its upper end into the chamber F and provided with the ports E' communicating with the hot water supply, the valve G located in the chamber F and coöperating with the outlet therefrom and with the port I, and the valve G' in the chamber F' controlling the outlet therefrom and coöperating with the valve G in the manner and for the purpose described.

5. The combination of the valve casing A having the pipe connections B, C and D and containing the chamber F having the by-pass J and an outlet at its upper end, and provided with the port I communicating with the cold water supply, the supplemental casing A' screwed into the lower end of the main casing A and abutting against the lower end of the cylindrical wall of the chamber F, said supplemental casing A' containing the valve chamber F' and having an outlet into the chamber F at its upper end, and provided with the ports E' communicating with the hot water supply, and the valves G and G' located in the respective chambers F and F' and coöperating with each other and with the admission and outlet ports of said chambers in the manner described, the screw cap E closing the lower end of the main casing A, and the spring K interposed between said cap and the valve G', substantially as set forth.

EARL G. WATROUS.

Witnesses:
Louis B. Erwin,
Robert Dobberman.

Copies of this patent may be obtained for five cents each, by addressing the "Commissioner of Patents, Washington, D. C."